United States Patent [19]

Kim

[11] Patent Number: 5,688,167
[45] Date of Patent: Nov. 18, 1997

[54] AUTO LOUVER SYSTEM FOR A VEHICLE

[75] Inventor: Jin-Suk Kim, Ulsan, Rep. of Korea

[73] Assignee: Hyundai Motor Co., Ltd., Seoul, Rep. of Korea

[21] Appl. No.: 662,499

[22] Filed: Jun. 13, 1996

[30] Foreign Application Priority Data

Jun. 13, 1995 [KR] Rep. of Korea ............... 95-15538

[51] Int. Cl.$^6$ ................................... B60H 1/34
[52] U.S. Cl. ............................ 454/153; 454/285
[58] Field of Search ......................... 454/153, 202, 454/285; 415/125

[56] References Cited

U.S. PATENT DOCUMENTS

| 2,196,308 | 4/1940 | Johnston | 454/285 |
| 3,699,873 | 10/1972 | Irvin | 454/202 X |
| 4,007,673 | 2/1977 | Zaloga | 454/285 |

*Primary Examiner*—Harold Joyce

[57] ABSTRACT

An automatic louver system for a vehicle having a plurality of wind screens, includes a mechanism for generating a reciprocation movement, a mechanism which rotatably moves according to the reciprocation movement, and a mechanism for moving the plurality of wind screens disposed in a louver body so as to effectively and continuously change the direction of the wind flowing through the wind screens.

23 Claims, 5 Drawing Sheets

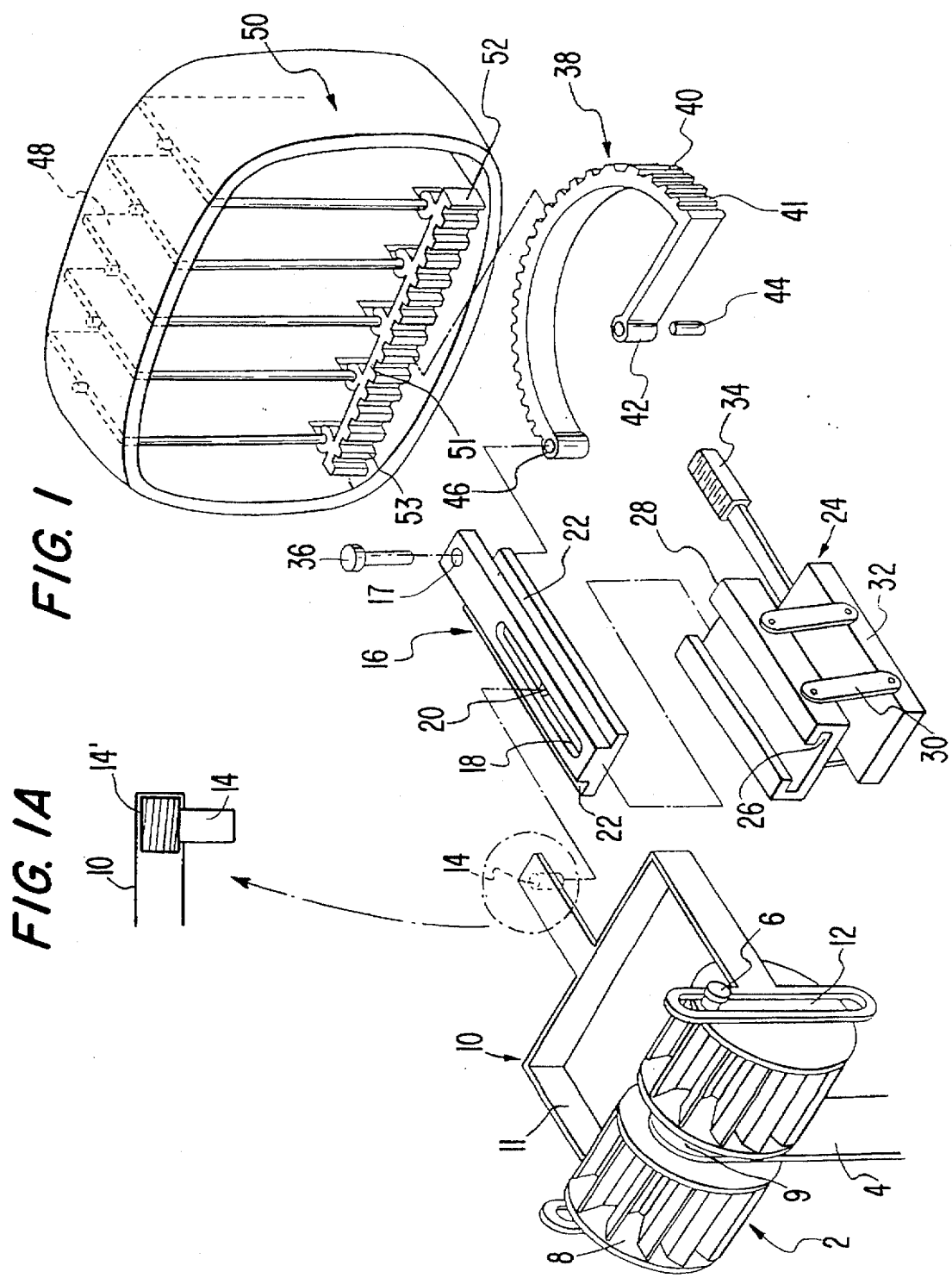

AUTO LOUVER SYSTEM FOR A VEHICLE

BACKGROUND OF THE INVENTION

1. Field of the Invention

The present invention relates to an automatic louver system for a vehicle and more particularly, to an indoor automatic louver system for a vehicle, which is attached to a certain area of the vehicle for effectively circulating air in the vehicle so as to repeatedly and continuously change the direction of the air or wind in an operational state.

2. Description of Related Art

Various types of indoor louvers for a vehicle are known in the art. Generally, an air conditioning system for a vehicle includes an air conditioner, a fan, pipes, and an indoor louver for controlling the direction of the wind. The fan functions to circulate indoor or outdoor air through a heater or an air conditioner, the pipes function to deliver the air from the fan to everywhere in the vehicle, and the indoor louver having wind screens functions to change the direction of the wind (air). The wind screens can be controlled to vary their positions.

However, such conventional indoor louvers for a vehicle suffer from a number of problems. For example, it is inconvenient for the user since the user, e.g. a driver or a passenger, has to control the louver manually, and it is possible to miscontrol the louver if the user does not know the controlling method. Therefore, the conventional indoor louvers cannot be used effectively in air conditioning and heating systems. Furthermore, the effectiveness of the air conditioning and heating systems is reduced since the conventional indoor louvers are controlled in one-way direction.

SUMMARY OF THE INVENTION

Accordingly, it is an object of the present invention to provide an improved indoor automatic louver system for a vehicle, which eliminates the above problems encountered with conventional indoor louvers for a vehicle.

Another object of the present invention is to provide an indoor automatic louver system for a vehicle, which can continuously change the direction of the air using a simple structure without the use of an additional power source.

A further object of the present invention is to provide an indoor automatic louver system which includes a power generating member disposed within a pipe of an air conditioning system for generating a revolution power by the wind pressure of a fan, a crank rod for converting a reciprocation movement from the revolution motion of the power generating member, an intermittent member intermittently connected to a free end of the crank rod, a clutch member for fixedly connecting the crank rod and the intermittent member, a course changing member connected to the intermittent member for providing a rotation movement, and a wind direction changing member tightly connected to a plurality of wind screens disposed in parallel within a louver body-and being movably connected to the course changing member for arranging the position of the wind screens.

Still another object of the present invention is to provide an indoor louver system which further includes a pair of windmills as the power generating member, a bearing fixed to the pipe of an air conditioning system for supporting a center of a windmill shaft, a pair of cam shafts disposed on the circumference of the outer surfaces of the windmills thereof, a crank rod having a pair of sliding holes for slidably receiving the cam shafts and a projection for connecting to an intermittent member, the intermittent member having an aperture for receiving the projection through a groove, a clutch member having a guide block for slidably moving the intermittent member through a channel thereof and a slider connected to the guide block through a plurality of lift arms for lifting the guide block, a course changing member having a sector gear, and a wind direction changing member having a rack gear in a gearing relationship with the sector wheel, whereby the direction of the wind screens disposed in a louver body is effectively changed so as to change the direction of the wind flowing therethrough.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to an automatic louver system for a vehicle having a plurality of wind screens, including reciprocation means for generating a reciprocation movement, changing means for rotatably moving according to the reciprocation movement generated by the reciprocating means, and rack means for movably connecting with the Changing means so as to move the plurality of wind screens.

Further, the present invention is directed to a method of moving a plurality of wind screens in a vehicle, including the steps of generating a reciprocation movement to a course changing member, rotatably moving the course changing member according to the reciprocation movement, and moving a rack member according to the movement of the course changing member so as to move the plurality of wind screens.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIG. 1 is an exploded perspective view of an automatic louver system for a vehicle according to the embodiments of the present invention, and FIG. 1A is an enlarged view of a projection shown in FIG. 1;

DESCRIPTION OF THE PREFERRED EMBODIMENTS

Figure 2A:
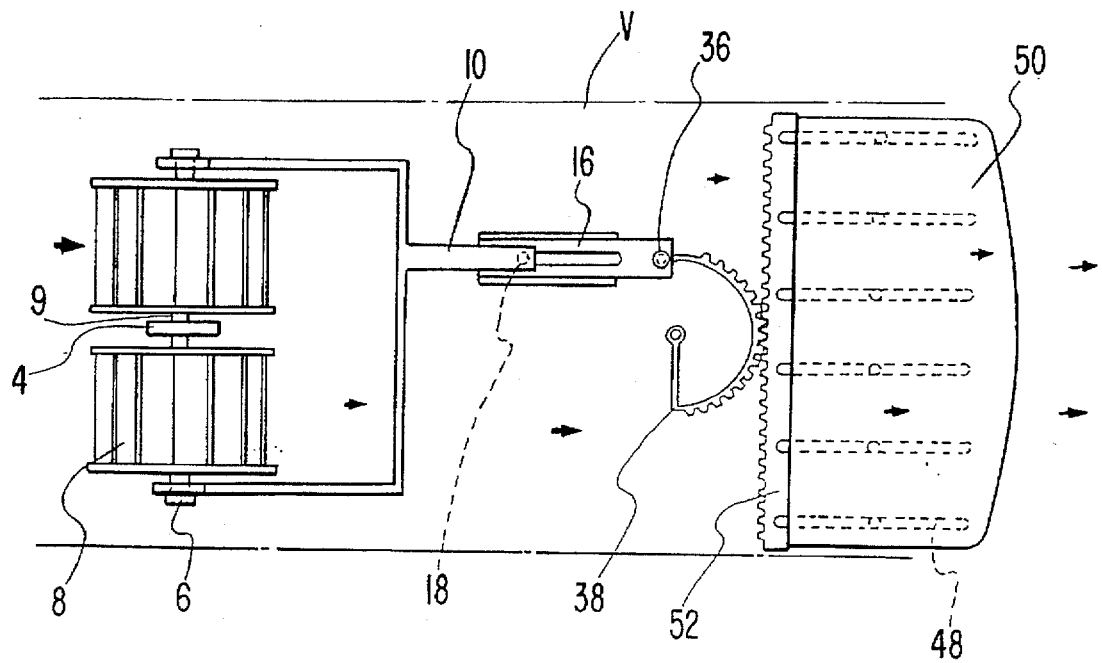
FIG. 2(A) is a top plan view of the automatic louver system in a center wind direction position according to the embodiments of the present invention.
Figure 2B:
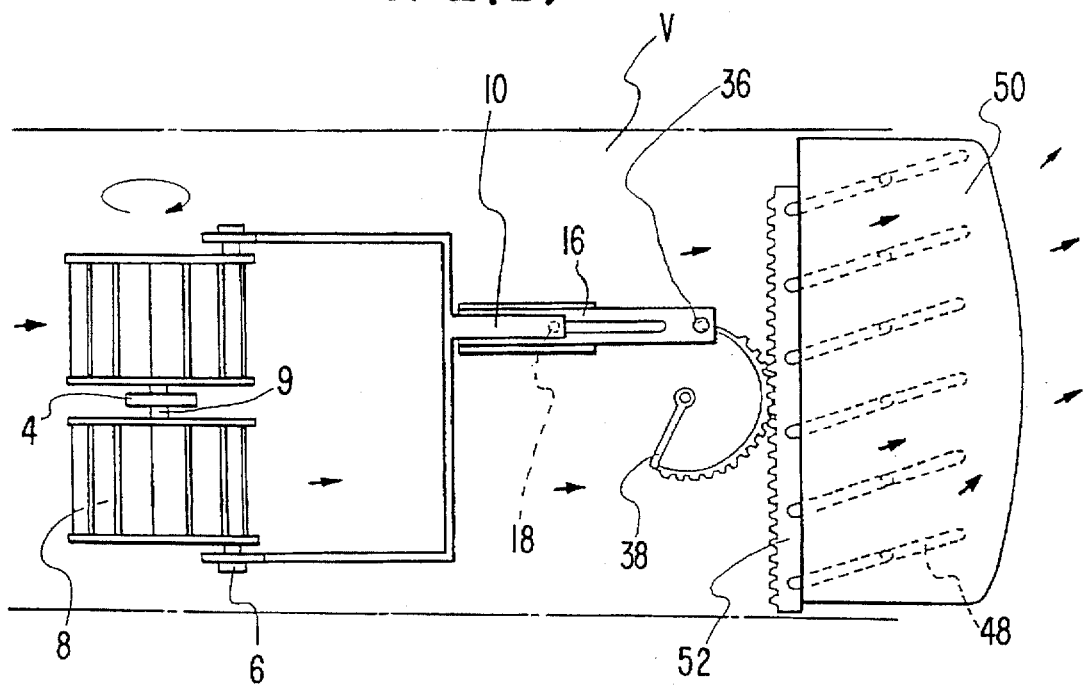
FIG. 2(B) is a top plan view of the automatic louver system in a left wind direction position according to the embodiments of the present invention.

Referring now in detail to the drawings for the purpose of illustrating preferred embodiments of the present invention, an indoor louver system for a vehicle according to the embodiments of the present invention, as shown in FIGS. 1, 2(A), and 2(B), includes a power generating member 2, a crank rod 10 connected to the power generating member 2, an intermittent member 16 connected to the crank rod 10, a clutch member 24 connected to the intermittent member 16, a course changing member 38 connected to the intermittent member 16, and a wind direction changing member 52 in a gearing relationship with the course changing member 38.

The power generating member 2 disposed within a pipe V (FIGS. 2(A) and 2(B)) for use with an air conditioning/heating system generates a revolution force by the wind pressure within the pipe V. The power generating member 2 includes a pair of windmills 8, a pair of cam shafts 6 disposed on the outer surfaces of the windmills 8, a bearing 4 fixed to the pipe V for supporting a center shaft 9 of the windmills 8.

The crank rod 10 includes a pair of legs 11 and a projection 14 extending from an end portion of the rod 10. The projection 14 is fixed to a spring 14' disposed within the end portion of the rod 10 so that the projection 14 can move resiliently as shown in the enlarged detail view of the projection 14 in FIG. 1A. Each leg 11 has a sliding hole 12 for slidably receiving the corresponding cam shaft 6. Accordingly, the rotation force of the windmills 8 causes the crank rod 10 to reciprocate.

The intermittent member 16 includes an operating groove 18 disposed on an upper surface thereof, a recess 20 disposed within the operating groove 18 for slidably receiving the projection 14 of the crank rod 10 via the operating groove 18, a pair of guiding shoes 22 disposed on both sides of the groove 18, and an aperture 17 disposed at an end portion of the intermittent member 16 for receiving a pin 36 to connect with the course changing member 38.

The clutch member 24 includes a guide block 28 having a guiding channel 26 for slidably receiving the shoes 22 of the intermittent member 16, a slider 32, and a handle 34 fixed to the slider 32. The slider 32 has a plurality of lift arms 30 movably connected to the guide block 28.

By using the clutch member 24, an intermittent stage between the projection 14 and the recess 20 is formed. At this time, the guide block 28 is moved up in a vertical direction due to surrounding walls (not shown) and the slider 32 is moved in a horizontal direction by manually operating the handle 34. The handle 34 is exposed on the outside so that it can be operated by the user.

The course changing member 38 includes a sector wheel 40 having teeth 41, a central tubular shaft 42 of the sector wheel 40 rotatably connected to a fixed axle 44, and an end tubular shaft 46 of the sector wheel 40 rotatably connected to the aperture 17 of the intermittent member 16 by the pin 36.

The wind direction changing member 52 includes a rack gear 51 having teeth 53 for engaging with the teeth 41 of the sector wheel 40, and a plurality of wind screens 48 disposed in parallel within a louver body 50.

The automatic louver system for a vehicle according to the embodiments of the present invention operates as follows as shown in FIGS. 2(A)–4(B). First of all, a revolution force by the windmills 8 is generated when the interior of the pipe V of the air conditioning/heating system is full with wind generated by a fan (not shown) and the wind flows in the direction indicated by arrows as shown in FIG. 2(A). Then, the crank rod 10 moves linearly according to the rotation force of the windmills 8.

As a result, the course changing member 38 rotates as shown in FIGS. 2(A) and 2(B) due to the lineal movement of the intermittent member 16. This causes the plurality of wind screens 48 to reposition in a slant direction so that the wind flows in the direction indicated by arrows as shown in FIG. 2(B). That is, the wind screens 48 are oriented towards the left direction and the wind is output in the left direction.

Figure 3A:
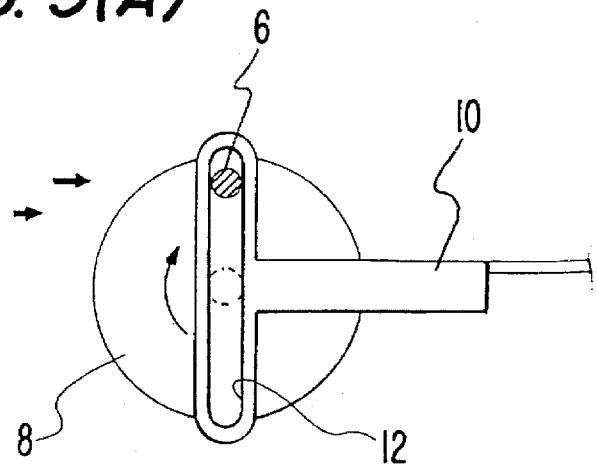
FIGS. 3(A), 3(B), and 3(C) are side views of a windmill and a crank rod of the automatic louver system in the center, left, and right wind direction positions, respectively, according to the embodiments of the present invention.
Figure 3B:
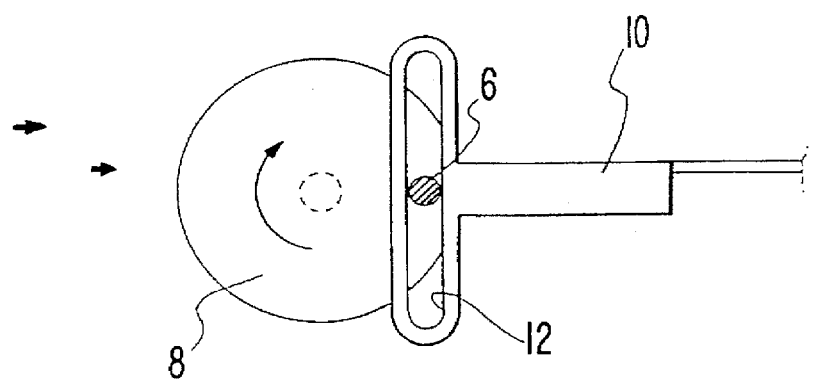
Figure 3C:
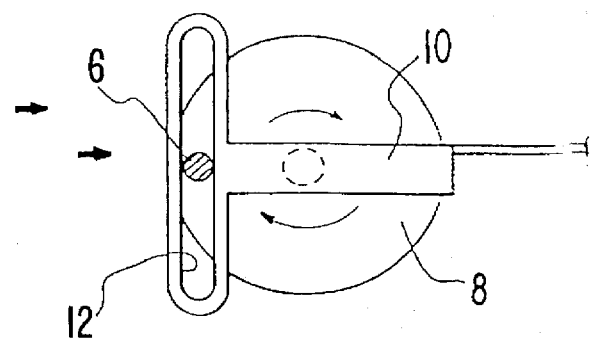

On the other hand, as shown in FIGS. 3(A)–3(C), if the cam shafts 6 are located within the upper end portion of the sliding hole 12 (FIG. 3(A)) or the lower end portion of the sliding hole 12, the Crank rod 10 is in a center wind direction position so that the wind flows in a horizontal direction as shown in FIG. 2(A).

If the cam shafts 6 are located within the middle portion of the sliding hole 12 as shown in FIG. 3(B) due to the rotation of the windmills 8 in a clockwise direction, for example, the crank rod 10 moves forwardly so that the wind flows in the left direction as shown in FIG. 2(B). However, if the cam shafts 6 are located within the middle portion of the sliding hole 12 as shown in FIG. 3(C), the crank rod 10 moves backwardly so that the wind flow in the right direction.

Accordingly, while the windmills 8 rotate in the clockwise direction, for example, the crank rod 10 reciprocates linearly. Therefore, the position of the wind screens 48 are continuously and repeatedly changed to a center wind position, a left wind position, the center wind position, and a right wind position, as long as the windmills 8 rotate.

Figure 4A:
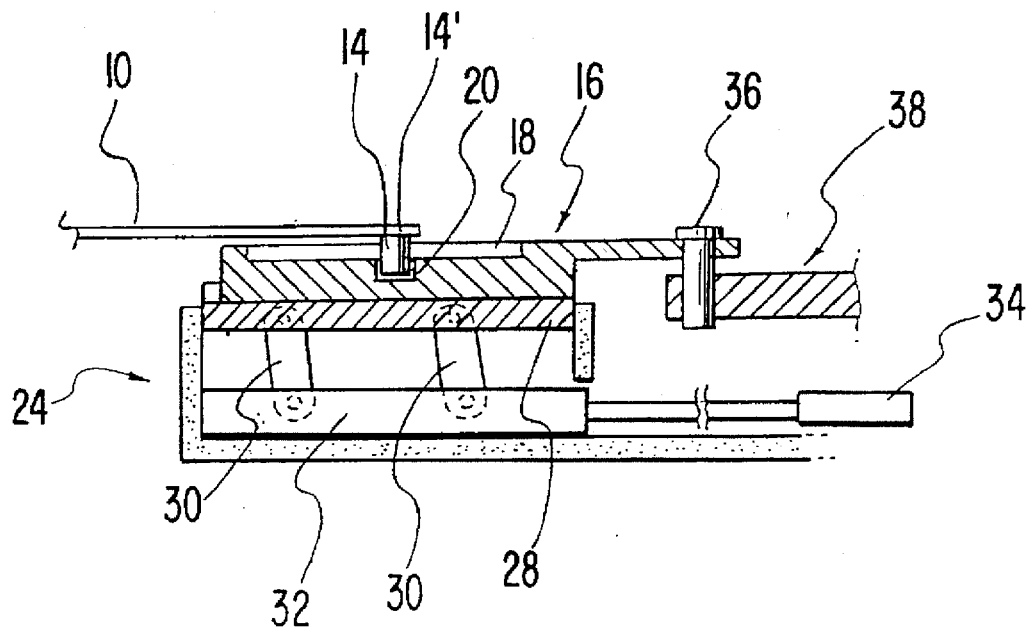
FIGS. 4(A) and 4(B) are sectional views of a clutch member of the automatic louver system in operation according to a first embodiment of the present invention.
Figure 4B:
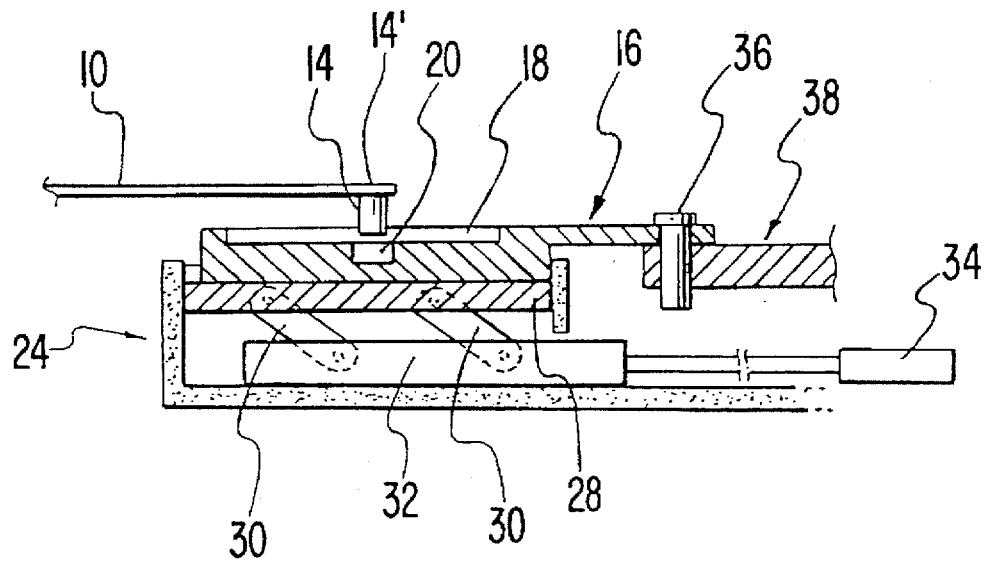

As shown in FIGS. 4(A) and 4(B), the indoor automatic louver system according to the present invention can be activated by operating the handle 34 of the clutch member 24. The projection 14 of the crank rod 10 is insertable tightly into the recess 20 of the intermittent member 16 due to the resilient force of the spring 14' within the crank rod 10, as shown in FIG. 4(A). If the handle 34 is pushed in, the plurality of lift arms 30 are arranged substantially in a vertical position and the projection 14 is inserted tightly into the recess 20 of the intermittent member 16. Thus, the lineal reciprocation motion of the crank rod 10 is transmitted to the course changing member 38 for changing the direction of the wind screens 48.

However, as shown in FIG. 4(B), if the user pulls out the handle 34 as indicated by an arrow, the plurality of lift arms 30 move to a slant position. Therefore, the projection 14 is released from the recess 20 so that the reciprocation motion of the crank rod 10 is not transmitted to the clutch member 24. Accordingly, the wind screens 48 disposed within the louver body 50 are not controlled since the course changing member 38 does not receive the reciprocation motion of the crank rod 10.

Figure 5:
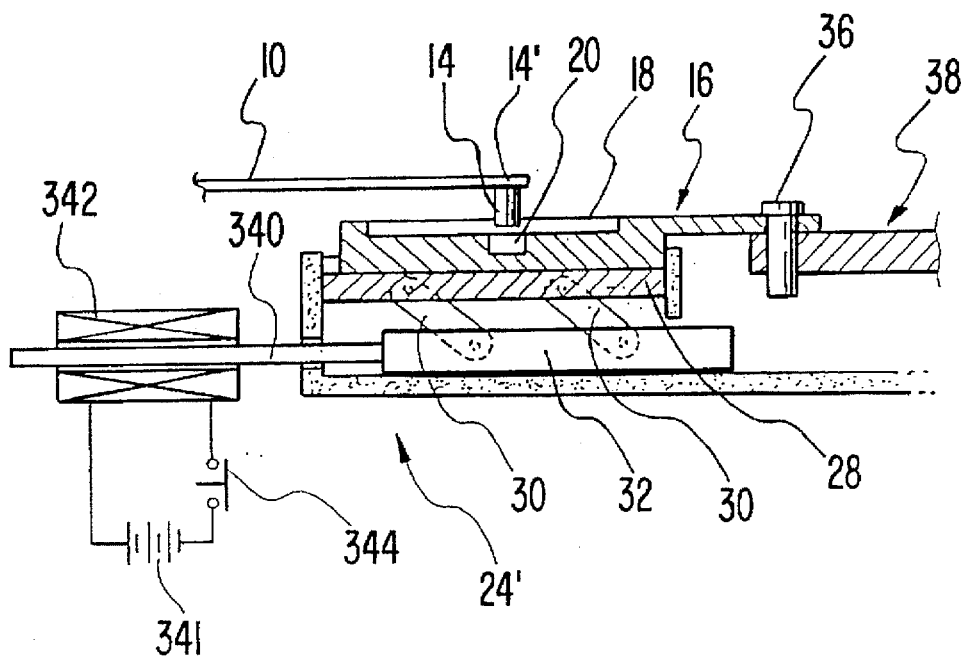
FIG. 5 is a sectional view of the clutch member of the automatic louver system according to a second embodiment of the present invention.

Referring in detail to FIG. 5, there is illustrated an indoor automatic louver system in accordance with a second embodiment of the present invention. The system includes a clutch member 24' as shown in FIG. 5. The clutch member 24' includes a magnetic plate 340 extending from the slider 32, a solenoid 342 disposed around the magnetic plate 340 for magnetically pulling the plate 340 thereto, and an electric source 341, e.g. a battery, for the solenoid 342, and an ON/OFF switch 344 for turning on/off the solenoid 342.

When the switch 344 is turned ON, the solenoid 342 becomes an electromagnet and pulls the magnetic plate 340 thereto such that the projection 14 of the crank rod 10 is tightly inserted into the recess 20 of the intermittent member 16. As a result, the plurality of wind screens 48 are controlled as explained above. The same reference numerals are used to indicate that the elements of the clutch member 24' as shown in FIG. 5 are the same as the elements shown in FIG. 1.

Figure 6:
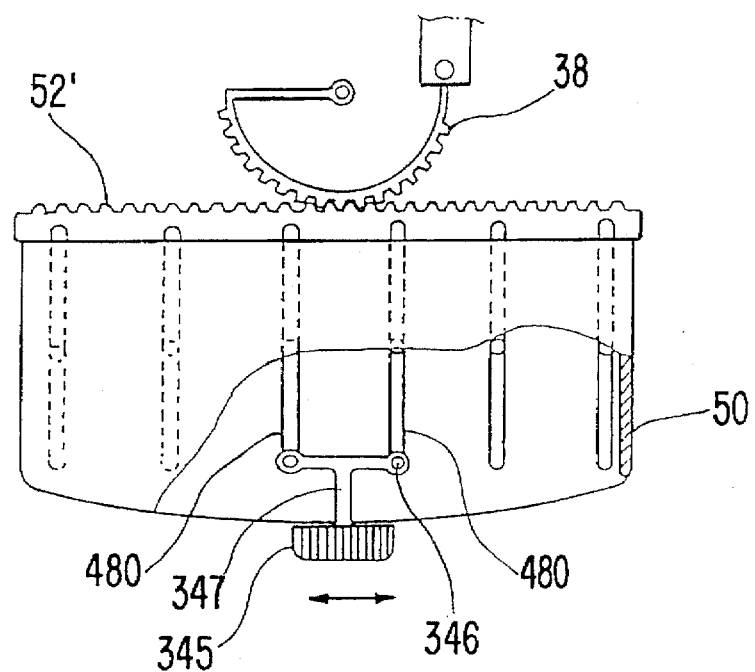
FIG. 6 is a top plan view of a wind direction changing member of the automatic louver system containing a cutaway portion to illustrate the construction thereof according to a third embodiment of the present invention.

Referring in detail to FIGS. 5 and 6, there is illustrated an indoor automatic louver system in accordance with a third embodiment of the present invention. The system includes a wind direction changing member 52'. The wind direction changing member 52' includes a wind direction changing handle 345, a T-shaped connector 347 connected to the handle 345 and pivotally to ends of a pair of center wind screens 480 via hinges 346, and other elements as shown in FIG. 6 having the same reference numerals as the elements shown in FIG. 1 to indicate that they are the same.

According to the third embodiment, the wind direction can be changed by manually operating the wind direction changing handle 345 as indicated by an arrow as shown in FIG. 6. In this case, the clutch member 24' as shown in FIG. 5 should be operated with the wind direction changing member 52' of FIG. 6.

That is, when the switch 344 is ON, the wind screens 48 are operated automatically. But, the wind screens 48 do not operate automatically when the switch 344 is OFF. At this time, the user can manually control the wind direction changing handle 345 for changing the position of the wind screens 48.

Accordingly, the indoor automatic louver system for a vehicle according to the embodiments of the present invention is simple in structure, economical to manufacture, easy to use and excellent in performance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic louver system for a vehicle having a plurality of wind screens, comprising:
   reciprocating means for generating a reciprocation movement;
   changing means for rotatably moving according to the reciprocation movement generated by the reciprocating means; and
   rack means for movably connecting with the changing means so as to move the plurality of wind screens.

2. A system of claim 1, wherein the reciprocating means includes:
   rotation means for providing a rotation movement, and
   conversion means for converting the rotation movement into the reciprocation movement.

3. A system of claim 2, wherein the rotation means includes:
   a windmill disposed in a pipe and being rotatable by a wind pressure within the pipe to provide the rotation movement.

4. A system of claim 2, wherein the rotation means includes:
   a pair of windmills disposed in a pipe,
   a center shaft for connecting through centers of the pair of windmills, and
   a bearing fixed to the pipe for supporting the center shaft.

5. A system of claim 2, wherein the conversion means includes:
   rod means for movably connecting with the rotation means to provide the reciprocation movement, and
   intermittent means for movably connecting with the rod means so as to transmit the reciprocation movement to the changing means.

6. A system of claim 2, wherein the conversion means includes:
   a crank rod having first and second end portions for cooperating with the rotation means, and a third end portion having a projection for cooperating with an intermittent member for connecting with the changing means.

7. A system of claim 2, wherein the conversion means includes:
   an intermittent member having a first aperture for cooperating with a rod member and a second aperture for pivotally connecting with the changing means.

8. A system of claim 7, wherein the conversion means further includes:
   a guide block for guiding the intermittent member, and
   lift means for lifting the guide block so as to fixedly connect the intermittent member to the rod member.

9. A system of claim 8, wherein the lift means includes:
   a slider being movable in a direction of the reciprocation movement, and
   a plurality of arm members connected to the guide block and the slider such that the plurality of arm members are moved by the movement of the slider to lift or lower the guide block.

10. A system of claim 8, wherein the lift means is moved by either operating a handle or electromagnetically.

11. A system of claim 8, wherein the lift means includes:
   a magnetic plate for moving the guide block,
   a solenoid for magnetically moving the magnetic plate,
   a power supply for supplying power to the solenoid, and
   a switch for activating the solenoid.

12. A system of claim 1, wherein the changing means includes:
   a sector wheel having a first end for fixedly positioning the sector wheel, a second end connected to the reciprocating means for rotably moving the sector wheel, and teeth for being in a gearing relation with the rack means.

13. A system of claim 1, wherein the rack means includes:
   a rack gear having teeth on a first side for being in a gearing relation with the changing means, and connection portions on a second side for holding the plurality of wind screens.

14. A system of claim 8, further comprising:
   handle means for moving at least two of the plurality of wind screens manually.

15. A system of claim 1, further comprising:
   a handle for moving at least two of the plurality of wind screens, and
   a connector for connecting the handle and the two of the plurality of the wind screens.

16. A system of claim 6, wherein the crank rod includes:
   an elastic member at the third end portion thereof for resiliently moving the projection.

17. A method of moving a plurality of wind screens in a vehicle, comprising the steps of:
   generating a reciprocation movement to a course changing member;
   rotatably moving the course changing member according to the reciprocation movement; and linearly moving a rack member according to the movement of the course changing member so as to move the plurality of wind screens.

18. A method of claim 17, wherein the generating step includes the steps of:

providing a rotation movement, and converting the rotation movement into the reciprocation movement.

19. A method of claim 18, wherein the providing step includes the steps of:

disposing a windmill in a pipe, and rotating the windmill by a wind pressure within the pipe to provide the rotation movement.

20. A method of 18, wherein the converting step includes the steps of:

linearly moving a rod member by the rotation movement, and moving an intermittent member connected to the rod member by the lineal movement of the rod member so as to rotatably move the course changing member.

21. A method of claim 20, further comprising:

providing a guide block for guiding the intermittent member, and lifting the guide block so as to fixedly connect the intermittent member to the rod member.

22. A method of claim 21, wherein the lifting step includes at least one of the following steps:

lifting the guide block by operating a first handle, and lifting the guide block electromagnetically.

23. A method of claim 22, wherein the step of lifting the guide block electromagnetically includes the steps of:

providing a second handle for moving two of the plurality of wind screens manually, and providing a connector for connecting the second handle and the two of the plurality of wind screens.

* * * * *